(12) United States Patent
Gurevich et al.

(10) Patent No.: US 6,939,058 B2
(45) Date of Patent: Sep. 6, 2005

(54) OPTICAL MODULE FOR HIGH-SPEED BIDIRECTIONAL TRANSCEIVER

(75) Inventors: Igor Gurevich, Saarbrucken (DE); Victor Faibishenko, Union City, CA (US); Nikolai Fedyakin, Mountain View, CA (US); Shinkyo Kaku, San Jose, CA (US); Leonid Velikov, San Carlos, CA (US)

(73) Assignees: MicroAlign Technologies, Inc., San Carlos, CA (US); Allied Telesyn International Corp., Bothell, WA (US)

( * ) Notice: Subject to any disclaimer, the term of this patent is extended or adjusted under 35 U.S.C. 154(b) by 95 days.

(21) Appl. No.: 10/074,346

(22) Filed: Feb. 12, 2002

(65) Prior Publication Data

US 2003/0152336 A1 Aug. 14, 2003

(51) Int. Cl.[7] .................................................. G02B 6/36
(52) U.S. Cl. .............................. 385/93; 385/92; 385/88
(58) Field of Search ....................... 385/88, 89, 92–94, 385/14, 139; 398/128, 129, 135, 139

(56) References Cited

U.S. PATENT DOCUMENTS

| | | | |
|---|---|---|---|
| 4,592,619 A | | 6/1986 | Weidel |
| 4,767,171 A | * | 8/1988 | Keil et al. .................... 385/35 |
| 4,904,043 A | | 2/1990 | Schweizer |
| 5,127,075 A | * | 6/1992 | Althaus et al. ............... 385/94 |
| 5,408,559 A | * | 4/1995 | Takahashi et al. ............ 385/89 |
| 5,485,538 A | | 1/1996 | Bowen et al. |
| 5,487,124 A | | 1/1996 | Bowen et al. |
| 5,621,573 A | | 4/1997 | Lewis et al. |
| 5,796,899 A | | 8/1998 | Butrie et al. |
| 5,838,859 A | | 11/1998 | Butrie et al. |
| 5,841,562 A | | 11/1998 | Rangwala et al. |
| 5,848,211 A | * | 12/1998 | Yang et al. .................... 385/93 |
| 6,075,635 A | | 6/2000 | Butrie et al. |
| 6,128,134 A | * | 10/2000 | Feldman et al. ............. 359/565 |
| 6,142,680 A | * | 11/2000 | Kikuchi et al. ............... 385/93 |
| 6,282,000 B1 | * | 8/2001 | Kikuchi et al. ............. 398/136 |
| 6,624,507 B1 | * | 9/2003 | Nguyen et al. ............. 257/686 |
| 6,652,161 B2 | * | 11/2003 | Grann et al. .................. 385/93 |
| 6,722,793 B2 | * | 4/2004 | Althaus et al. ............... 385/92 |

* cited by examiner

*Primary Examiner*—Joseph Williams
*Assistant Examiner*—Peter Macchiarolo
(74) *Attorney, Agent, or Firm*—Cooley Godward LLP

(57) ABSTRACT

The optical module of the invention for high-speed bidirectional transceiver consists of a signal receiving unit, a signal transmitting unit, a common receiving-transmitting optical fiber, and a fiber coupling unit. The laser diode and the photodiode are arranged parallel to each other in closely located recesses of the module housing. Such an arrangement makes it possible to shorten distances for guiding lead wires from the terminals of the PC board to the respective terminals of the transmitting and receiving diodes. The laser diode emits a first transmitting laser beam that passes through a microobjective that collimates the beam and directs into onto a full-reflection mirror located inside the module housing. The full-reflection mirror reflects the first transmitting beam at an angle of 90° and transmits it to the end face of an optical fiber through an optical fiber collimator that centers the beam with the fiber core. The module is provided with a second mirror, which is fully transparent to the aforementioned first transmitting beam, but is fully reflective to a second transmitting beam that may propagate in a direction opposite to the first transmitting beam on a different wavelength. Alignment of the optical components is facilitated due to the fact that it is carried out with diffractionally limited and collimated beams.

12 Claims, 7 Drawing Sheets

OPTICAL MODULE FOR HIGH-SPEED BIDIRECTIONAL TRANSCEIVER

FIELD OF THE INVENTION

The present invention relates to the field of telecommunication, in particular to bidirectional wavelength division multiplex transmitter/receiver (hereinafter referred to as transceiver) module for use with a single-mode optical fiber in combination with high-speed control electronics. More specifically, the invention relates to a transceiver module having a special architecture that allows for decrease in overall dimensions of the module and for improvement in compatibility with respect to PCBs of high-speed controllers.

BACKGROUND OF THE INVENTION

In optical communication systems, the need may arise to multiplex different wavelength signals onto a single fiber. For example, wavelength multiplexing is one method for achieving full bidirectional transmission on a single fiber. In its simplest form, a bidirectional system may comprise two stations, S1 and S2, which transmit information at wavelengths $\lambda_1$ and $\lambda_2$, respectively. Thus, station S1 needs a transmitter, which operates at $\lambda_1$ and a receiver, which is tuned to wavelength $\lambda_2$. Station S2, obviously, has the opposite requirements. Each station also needs a duplexing element to inject both wavelengths onto the single transmitting fiber. Although simple in theory, such an arrangement is cumbersome in implementation. For example, each station comprises a separate transmitter, receiver, and duplexer. Therefore, some sort of optical coupling must also be provided, for example, by using optical waveguides. Such coupling requires many expensive and time-consuming adjustments to achieve optimum alignment. Additionally, the optical losses attributed to this coupling, including attachment between the duplexer, fiber, transmitter and receiver, may degrade the overall performance of the station to an unacceptable level.

An alternative to this straightforward implementation is disclosed in U.S. Pat. No. 4,592,619 issued to E. Weidel on Jun. 3, 1986. Weidel discloses an optical coupling element utilizing a variety of microoptic elements with spherical and plane surfaces for collimating, focusing and redirecting transmitted/received light waves. Although an improvement over the prior art, the Weidel arrangement utilizes at least one optical element, which must be traversed twice by a received light signal. Further, Weidel is necessarily limited to providing coupling between both a transmitter and receiver to an optical fiber. However, there exist situations wherein a pair of transmitters, operating at different wavelengths, must be coupled over the same fiber (unidirectional transmitter).

Thus, a need remains in the prior art for a dual wavelength optical coupler, which is robust in design and is capable of operating in either a bidirectional mode (transmitter and receiver) or unidirectional mode (two transmitters or two receivers).

An attempt to solve the problems that occur in the system of U.S. Pat. No. 4,592,619 is made in U.S. Pat. No. 4,904,043 issued in 1990 to R. Schweizer. This technique was developed in AT&T Bell Laboratories. In this patent, Schweizer describes a device, which practically is the nearest prototype of modern bidirectional transceivers as it contains all elements that found use in subsequent devices of this type. Dual wavelength coupling is achieved utilizing a set of three lenses and a dichroic filter, all held in a precision die-cast housing with the active devices. In one embodiment, the coupler may be used as a bidirectional transceiving device that includes a LED operating on a first wavelength and a PIN receptive to a different wavelength. In another embodiment, the coupler may be used as a unidirectional device, including either a pair of LEDs at different wavelengths or a pair of PINs at different wavelengths. One of the objects of the design described by Schweizer is to avoid active alignment of the components forming the coupler. By careful choice of the lenses, alignment tolerances may be minimized to the extent that the filter and lenses may be merely placed in their proper locations within the housing. Another aspect is to provide a coupler design, which is flexible enough to be utilized with a number of different lenses, as well as different transmitting and receiving wavelengths.

However, a main disadvantage of the device disclosed in U.S. Pat. No. 4,904,043 consists in that a photoreceiver should always be optically coaxial with an optical axis of one of two light sources that generate light of a working wavelength $\lambda_1$ or $\lambda_2$. Such a design is inconvenient for suppression of crosstalk, e.g., a parasitic signal with the wavelength $\lambda_2$ when a photodiode receives a useful signal with wavelength $\lambda_1$.

All further developments in the field of bidirectional transceivers had design close to the aforementioned device developed by AT&T Bell Laboratories, but with positions of the photodiode and the second light source reversed for obviating the inconvenience inherent in the device described in U.S. Pat. No. 4,904,043.

U.S. Pat. No. 5,485,538 issued on Jan. 16, 1996 to T. Bowen et al. discloses a typical bidirectional transceiver with orthogonal arrangement of two light beams with wavelength $\lambda_1$ and $\lambda_2$. The device comprises a compact optical transceiver that includes a ceramic mounting block with a laser diode abutting a first end of the mounting block for generating light of a first wavelength. A holographic optical element (HOE) is positioned adjacent a laser diode and acts as a hologram lens which receives and focuses the generated light to the end face of an optical fiber which is attached to the compact optical transceiver. A glass element is mounted on the mounting block between the diode and the optical fiber end face and includes a dichroic beam splitter that passes light of a first wavelength $\lambda_1$ and deflects light of a second wavelength $\lambda_2$. The dichroic beam splitter is mounted in an angular positioning groove of the mounting block and receives and passes the generated light of the first wavelength $\lambda_1$ which has been focused by the HOE. From a remote transmitter, light of a second wavelength $\lambda_2$ is then transmitted through the optical fiber to the compact optical transceiver from a direction opposite to that of the light generated by the laser diode. The light transmitted from the optical fiber is then transmitted and passed through a section of the fiber supported by a ferrule attachable to the optical fiber and attached in a second V-shaped positioning groove of the ceramic mounting block. The light of the second wavelength is sent to the beam-splitter and is deflected through a bore hole in the ceramic mounting block to a detector abutting the bottom of the mounting block. A blocking filter can be included for blocking light of wavelengths other than the first and second wavelengths from the detector.

One disadvantage of the transceiver of U.S. Pat. No. 5,485,538 consists in that all optical elements, including HOE, used for beam management transform the beams into converging or diverging beams. This creates significant problems for alignment of the beams because all the optical elements must be adjusted simultaneously. Another disadvantage, which is inherent in all orthogonal bidirectional transceivers, consists in that their geometry is unsuitable for use in conjunction with high-speed controllers.

Another U.S. Pat. No. 5,487,124 issued on Jan. 23, 1996 to the same applicants as the previous patent describes a bidirectional transceiver that differs from the one described in U.S. Pat. No. 5,485,538 by the fact that the HOE was replaced by a GREEN lens. It can be clearly seen from FIG. 2 of U.S. Pat. No. 5,487,124 that the beams of the light source are transformed into converging and diverging beams. Therefore the device of this patent entails all disadvantages of the previously described design, including speed limitations due to geometry.

It should be noted that both designes disclosed in two previous patents were developed at the Whitaker Corporation, Wilmington, Del. In an attempt to solve problems associated with difficulties of alignment mentioned in two previous patents, the Whitaker Corporation developed a new design described in U.S. Pat. No. 5,621,573 issued on Apr. 15, 1997 to W. Lewis, et al. This patent describes a bidirectional link that allows sequential or simultaneous transmission and reception of optical signals using conventional components. To effect the relatively simple alignment of the devices and components, the emitter or transmitter is disposed in a subassembly having a sub-housing with the required optical focusing beam splitting elements disposed therein. This subassembly is optically aligned in a relatively simple active alignment process, and the subassembly is then inserted into the main housing of the bidirectional link. At this stage, a detector is mounted in the main housing and is aligned optically with the pre-aligned elements of the sub-assembly described above. The detector is then fixed using common adhesive and the assembly of the bidirectional link is complete. In this device, the inventors for the first time used so-called canted fibers and lens subassemblies that comprise a lens and a fiber preassembled in a common ferrule-type sub-housing that simplifies manipulation and adjustment. The fiber end face can be slightly inclined from a perpendicular to the optical axis of the lens for decreasing reflection and thus for improving optical coupling. Although the bidirectional transceiver of U.S. Pat. No. 5,621,573 partially simplifies the alignment procedure due to the use of preassembled units, the limitations by speed remain unsolved due to the use of practically the same geometry as in all previously known orthogonal arrangements.

In subsequent years, designs of orthogonal bidirectional transceivers were improved with a new technique developed by Lucent Technologies Inc. This new technique was aimed at improved alignment, more efficient optical coupling, and suppression of crosstalk. Thus, U.S. Pat. No. 5,796,899 issued to T. Butrie et al. on Aug. 18, 1998 describes an optical transceiver assembly for use in a bidirectional system that includes a beam splitter to direct an incoming signal to a photodiode. An outgoing signal from a laser diode is partially transmitted and partially reflected by the splitter. The reflected signal, which may reach the photodiode, constitutes crosstalk which is reduced by means of a cavity positioned to receive the reflected signal and an oblique surface within the cavity adapted to prevent much of the reflected signal from reaching the photodiode.

U.S. Pat. No. 5,838,859 issued on Nov. 17, 1998 to the same applicants as in U.S. Pat. No. 5,796,899 describes an optical transceiver assembly for use in a bidirectional system that includes a beam splitter to direct an incoming signal to a photodiode. An outgoing signal from a laser diode is partially transmitted and partially reflected by the splitter. The reflected signal, which may reach the photodiode, constitutes crosstalk, which is reduced by orienting the polarization direction of the splitter essentially parallel to that of the outgoing signal from the laser diode. In another embodiment, which enhances coupling efficiency, a single element aspheric lens is positioned between the laser diode and the splitter.

Another device developed by Lucent Technologies Inc. is a modular form that improves accuracy of alignment and makes the device suitable for mass production. This device is described in U.S. Pat. No. 5,841,562 issued on Nov. 24, 1998 to S. Rangwala, et al. In accordance with one aspect of this invention, a transceiver comprises a transmitter module and a receiver-splitter module, which is plugged into a self-aligning socket of the transmitter module. In one embodiment, the transmitter module includes a light source lensed to an opening in the socket, and the receiver-splitter module includes a ferrule, which is plugged into the socket. The ferrule carries an optical fiber so that one end of the fiber is optically coupled to the light source. This coupling enables an outgoing optical signal to be partially transmitted to a fiber pigtail located at the opposite end of the ferrule. A splitter is located at the other end of the fiber so that an incoming optical signal on the fiber pigtail is partially reflected to a light detector.

U.S. Pat. No. 6,075,635 issued on Jun. 13, 2000 to T. Butrie at al. describes a bidirectional optical transceiver developed at Lucent Technologies Inc. that includes a housing in which a light source, lens, beam splitter, photodetector and an optical fiber are mounted. The lens focuses an outgoing optical signal from the source through the splitter to the end face of the fiber. The splitter directs an incoming optical signal to the photodetector. In order to reduce reflections of the outgoing signal from the end face of the fiber, and hence crosstalk, without also sacrificing significantly the coupling efficiency to the fiber, the fiber end face is beveled at an acute angle $\phi$ to the normal to the common axis of the source, splitter and fiber, and the fiber is tilted at an acute angle $\theta$ to the same axis. In a preferred embodiment, which further enhances coupling efficiency, the fiber end face is beveled at an even smaller acute angle $\phi'$ to the normal to the fiber axis, and the fiber axis is tilted at an acute angle $\theta$ to the common axis, where $\phi'$ is about $2\theta$.

A disadvantage common to all four last-mentioned patents of Lucent Technologies Inc., as well to all preceding structures, is that the orthogonal geometry used in the bidirectional optical transceivers described in the aforementioned patents make it difficult to use such devices in high-speed systems with frequencies of 500 MHz or higher.

In fact, all known bidirectional transceivers, as well as those described above, are based on the use of standard commercially-produced laser diodes and photodiodes, such as, e.g., TO CAN packages. The orthogonal arrangement and geometrical dimensions of the aforementioned laser diodes and photodiodes required relatively long lead wires (not less than 10 mm) for commutation with the PC board circuitry. This limitation restricts the speed of transmission data through the bidirectional transceiver.

It is known that inductance depends on the length of the conductor. Therefore, if one takes as a LD series resistance 8 Ohms and accepts 1 nH/mm inductance, it is easy to evaluate that the integration time constant of LD ($\tau=L/r$) for 10 mm lead wire is greater than 1.25 ns and for 3 mm lead wire is greater than 0.375 ns, correspondingly. The first lead wire limits gigabit applications of the bidirectional transceiver, while the second one allows to operate at data rates coming to 2.5 Gb/s.

OBJECTS OF THE INVENTION

It is an object of the present invention to provide an optical module for a high-speed bidirectional transceiver which is simple in construction, inexpensive to manufacture, facilitates optical alignment of the optical components during assembling and therefore is suitable for mass production, utilizes short lead wires that results in low inductivity of the device, can be mounted on a PC board and matched with its circuitry, and allows, in combination with respective electronics, to reach data transmission speeds exceeding 1 Ggbit/sec.

SUMMARY OF THE INVENTION

The optical module of the invention for high-speed bidirectional transceiver consists of a signal receiving unit, a signal transmitting unit, a common receiving-transmitting optical fiber, and a fiber coupling unit. It is understood that for transmitting and for receiving data a transceiver with a similar optical module should be provided at a remote location with which the first transceiver communicates in a bidirectional manner. All parts of each module are located in a common module housing, which has respective recesses for placement of the laser diode, photodiode, and other parts of the module. The main distinction of the optical module of the invention from the existing modules of this type consists in that the laser diode and the photodiode transmits and receives respective beams along parallel optical paths and are arranged side by side in closely located recesses of the module housing. Such an arrangement makes it possible to shorten distances for guiding lead wires from the terminals of the PC board to the respective terminals of the transmitting and receiving diodes. More specifically, the transmitting diode, i.e., the laser diode is inserted into a recess formed in a side wall of the module and emits a first transmitting laser beam that passes through a microobjective that collimates the beam and directs into onto a full-reflection mirror located inside the module housing. The full-reflection mirror reflects the first transmitting beam at an angle of 90° and transmits it to the end face of an optical fiber through an optical lens unit that centers the beam with the fiber core, so that information contained in the first transmitting beam is conveyed to the receiver on the opposite end of the fiber. On the way of propagation of the aforementioned first transmitting beam, the module is provided with a second mirror, which is fully transparent to the aforementioned first transmitting beam, but is fully reflective to the second transmitting beam that may propagate in a direction opposite to the first transmitting beam on a different wavelength. The first and the second transmitting beams are coaxial on the major part of the their optical paths and propagate on different wavelengths through the same fiber core. The second mirror reflects the second transmitting beam at an angle of 90° towards the photodiode.

Thus, in spite of an increased number of optical elements (an additional mirror and collimating lenses) the module of the invention simplifies an adjustment procedure during assembling due to a novel module architecture (with parallel arrangement of the beams generated by the laser diode and received by the photodiode) and due to the fact that parts of the beams remain diffractionally limited and collimated. In contrast to the existing optical modules of similar type, in which any adjustment requires involvement of all optical elements simultaneously (because of converging and diverging shapes of the beams), in the module of the invention each element can be adjusted individually because on the main transmitting-receiving optical path the beams remain collimated irrespective of relative movements between the elements (such as, e.g., mirrors).

DETAILED DESCRIPTION OF THE INVENTION

In an attempt to find a solution for the problems of the prior art, the applicants understood that the problem associated with limitations in transmission speed cased by inductance of the lead wires can be solved by reducing the length of the wires. First the applicants tried to improve the classical orthogonal architecture of a bidirectional transceiver by coupling it with a vertical flexible PC board, then bending the diodes' terminals at 90°, and connecting them to the main PC board. Although this method allowed some increase in the transmission frequency, it appeared to be time and money consuming and not suitable for mass production.

The applicants also tried to place a laser diode and a photodiode on the same side of the bidirectional transceiver. This allowed direct plugging of the transceiver to holes of the PC board with minimum stray inductance between the laser diode and a laser driver, while electrical assembly of the transceiver on the PCB could be done under conditions of mass production. This method can be realized only on the basis of an entirely new optical beam management in which the beams remain on their main optical paths in a diffractionally limited (collimated) state. The use of collimated beams opens new avenues for simplification of alignment of optical elements during assembly. Thus, the applicants arrived at the present invention.

Figure 1:
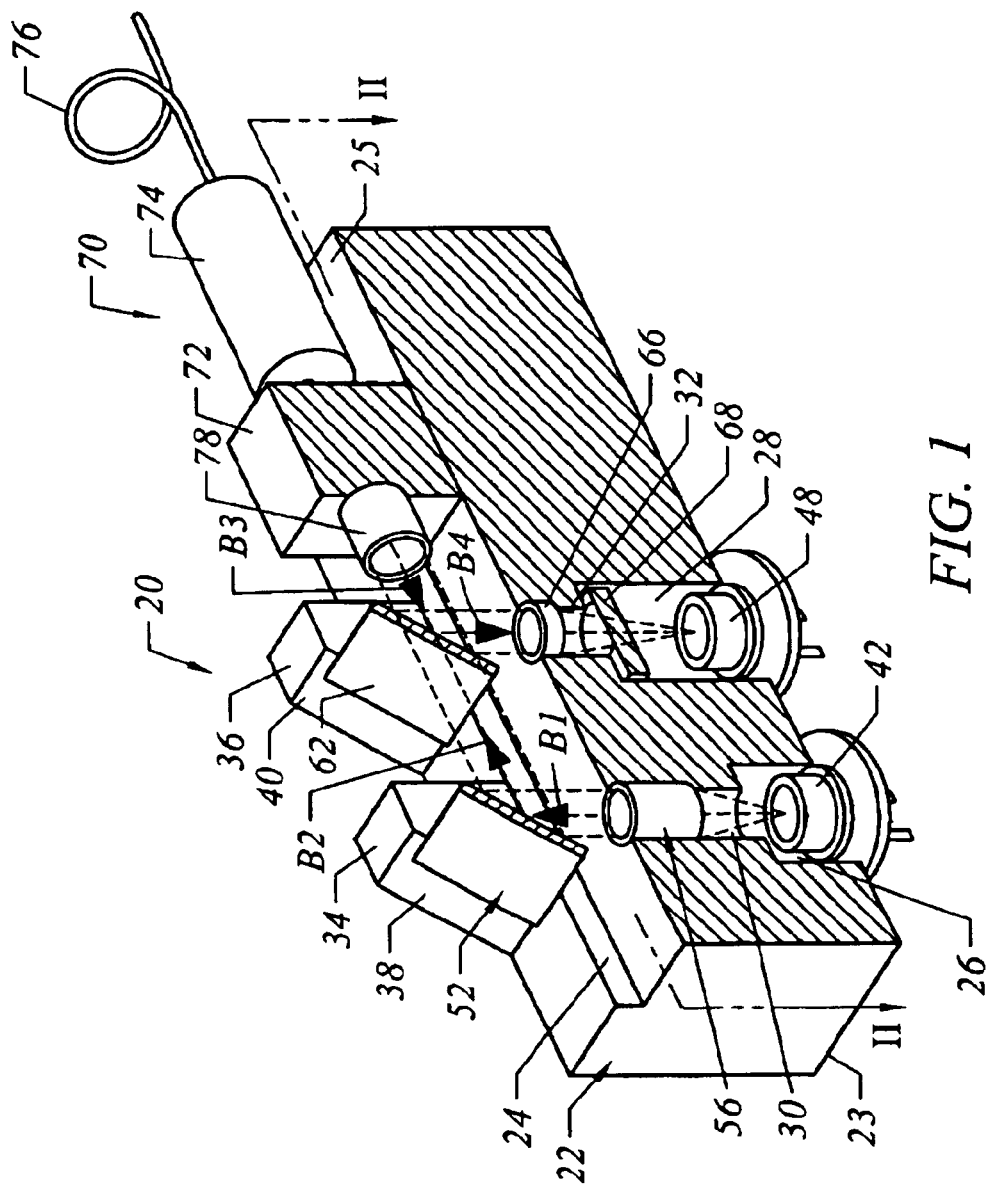
FIG. 1 is a three-dimensional view of the module in accordance with a first embodiment of the invention with a part removed for illustrating positions of recesses of the housing.
Figure 2:
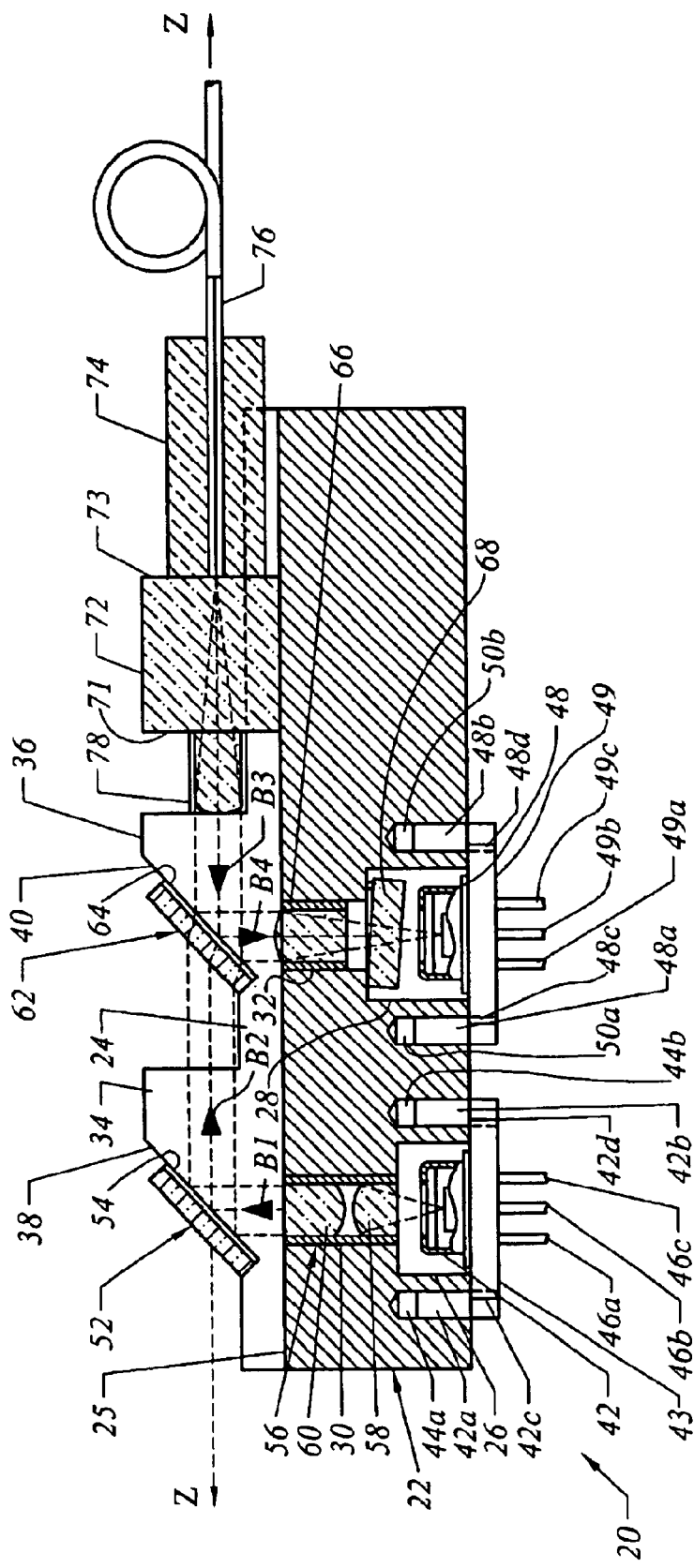
FIG. 2 is a sectional view of the module of FIG. 1 along line II—II of FIG. 1.

One embodiment of the optical module of the invention for a high-speed transmission bidirectional transceiver is shown in FIG. 1, which is a three-dimensional view of the module with a part removed for illustrating positions of recesses of the housing. FIG. 2 is a sectional view of the module along line II—II of FIG. 1. As can be seen from FIGS. 1 and 2, the optical module of the invention, which in general is designated by reference numeral 20, has a housing 22 in the form of a substantially rectangular parallelepiped with appropriate slots and recesses for accommodation of optical elements. In the embodiment shown in FIGS. 1 and 2, the housing 22 has a through longitudinal slot 24 of a rectangular cross section cut on one side of the housing 22. On the side 23 opposite to the slot 24, the housing 22 has two parallel slots 26 and 28 of a rectangular cross section which are perpendicular to the direction of the longitudinal slot 24 and which extend in the transverse direction of the housing 22. The transverse slots 26 and 28 are connected with the longitudinal slot 24 by holes 30 and 32, respectively.

Two lugs 34 and 36, which are formed on the housing 22 on the side of the longitudinal slot 24, are beveled at 45° to the direction of the longitudinal slot 24 and to respective holes 30 and 32, which are aligned with the positions of the beveled surfaces 38 and 40. More specifically, the longitudinal axes of holes 30 and 32 coincide approximately with the middles of the planes of the respective beveled surfaces 38 and 40.

The bottom 25 of the slot 24, the side 23 of the housing 22 opposite to slot 24, as well as the surfaces of the slots 26, 28 and holes 30 and 32 are used as base or reference surfaces for assembling and positioning of the optical elements of the transceiver. Therefore these surfaces, slots, and opening should be produced with strict tolerances with regard to respective flatness, perpendicularity, and parallelism.

The slot 26 accommodates a laser diode 42. The laser diode is fixed to the housing 22 by means of locking pins 42a and 42b inserted into the openings 44a and 44b of the housing 22 so that a part of the cross-section of each pin 42a and 42b passes through a respective semicircular recess 42c and 42d formed on the flange portion 43 of the laser diode 42. Terminals 46a, 46b, and 46c of the laser diode 42 extend outward from the surface 23 of the housing 22.

The slot 28, which is parallel to the slot 26, accommodates a photodiode 48. The photodiode 48 is fixed to the housing 22 by means of locking pins 48a and 48b inserted into the openings 50a and 50b of the housing 22 so that a part of the cross-section of each pin 48a and 48b passes through a respective semicircular recess 48c and 48d formed on the flange portion 49 of the photodiode 48. Terminals 49a, 49b, and 49c of the photodiode 48 extend outward from the surface 23 of the housing 22.

The beveled surface 38 is used as a support for a full-reflection mirror 52. The reflecting surface 54 of this mirror spans the longitudinal slot 24 in the direction transverse to the slot and faces the hole 30 at an angle of 45° to the direction of the hole axis. Inserted into the hole 30 is a two-lens objective 56 that consists of a first aspheric lens 58 and a second aspheric lens 60. As can be seen from FIGS. 1 and 2, the two-lens objective 56 is located between the output side of the laser diode 42 and the reflection surface 54 of the full-reflection mirror 52.

It is understood that a light beam B1 emitted by the laser diode 42 towards the mirror 52 will be fully reflected by the reflection surface 54 of this mirror in the direction parallel to the longitudinal slot 24 shown by the arrow B2 in FIGS. 1 and 2.

The beveled surface 40 is used as a support for a second mirror 62, which spans the longitudinal slot 24 in the direction transverse to the slot and faces the hole 32 at an angle of 45° to the direction of the hole axis. It should be noted that the mirror 62 reflects light of any wavelength except for the one generated by the laser diode 42. This means that the mirror 62 is fully transparent for beam B2 (FIG. 2), but reflects, at an angle of 45° towards the photodiode 48, the light (except for the one generated by the laser diode 42) that may fall onto the reflection surface 64 of this mirror. Inserted into the hole 32 is a lens element 66, and an optical filter 68 is placed between the lens element 66 and the photodiode 48. The optical filter 68 passes a specific wavelength, which is different from the wavelength of the light generated by the laser diode 42. For example, the laser diode 42 may generate a light signal with the wavelength of 1550 nm, while the filter 68 may pass only those optical signals that have a wavelength of 1310 nm.

On the side of the housing 22 opposite to the mirrors 52 and 62, the transceiver 20 is provided with an optical fiber connection unit 70 that consists of the following elements: an optically transparent spacer 72, which is vertically positioned by resting on the bottom surface 25 (FIG. 2) of the longitudinal slot; a fiber supporting ferrule 74 which is glued in a butt connection to the rear surface 73 of the spacer 72 and supports an optical fiber 76 having the end face in butt connection with the rear surface 71 of the spacer 72; and a lens element 78 glued to the front surface 71 of the spacer 72 and located in the slot 24.

The optical fiber connection unit 70 is preassembled so that the optical axis of the lens element 78 coincides with the optical axis Z—Z of the core of the optical fiber 76. The end of the optical fiber 76 opposite to the transceiver 20 may terminate in a standard single-mode fiber connector (female or male, not shown).

It is assumed that the aforementioned opposite end of the optical fiber 76 is connected to another transceiver (not shown) intended for communication with the transceiver 20 in a bidirectional mode by sending optical signals, e.g., of 1310 nm wavelength, to the photodiode 48 and by receiving optical signals, e.g., of 1550 nm wavelength from the laser diode 42.

The entire assembly shown in FIGS. 1 and 2 is enclosed in a casing (not shown), which may be sealed and forms the transceiver 20 into a self-contained closed module.

The transceiver 20 operates in the following manner.

When laser diode 42 is activated, it begins to emit a first transmitting laser beam B1 (FIG. 2) that passes through a lens objective 56 that collimates the beam B1 and directs it onto the full-reflection mirror 52. The full-reflection mirror 52 reflects the first transmitting beam B1 at an angle of 90° and transmits it in the form of the beam B2 towards the optical fiber connection unit 70. The use of aspheric lenses 58 and 60 in the lens objective 56 makes it possible to obtain beams B1 and B2, which are diffractionally limited and therefore substantially collimated within the length of the transceiver 20 (hereafter beams B1 and B2 will be referred to as collimated beams). Such shape of the beam B2, which has an essentially permanent cross-section on a section of the optical path from the mirror 52 to the end face of the optical fiber 76, is an important distinguishing feature of the transceiver of the invention. Formation of the aforementioned collimated beams significantly simplifies alignment of optical elements. For example, after a sub-unit consisting of the mirror 52 and the objective lens 56 and a sub-unit consisting of the mirror 62, the lens element 78, and the filter 68 are preassembled, further fine alignment of the laser diode 42, the photodiode 48, and the optical fiber connection unit 70 can be carried out individually and independently of each other.

The beam B2, reflected from the reflection surface 54 of the mirror 52 passes through the mirror 62 and through the lens element 78 that centers the beam B2 with the fiber core of the optical fiber 76, so that information contained in the first transmitting beam (B1, B2) is conveyed to the receiver on the opposite end of the fiber.

Simultaneously, another optical signal in the form of the beam B3 (FIG. 2) is transmitted through the same optical fiber 76 in the direction opposite to the direction of the beam B2. The beam B3 should be an optical beam with the wavelength different from 1550 nm, e.g., it may have a wavelength of 1310 nm. The lens element 78 collimates the beam B3 into a collimated beam, which is directed towards the mirror 62. The reflection surface 64 of this mirror reflects the beam B3 at an angle of 90° towards the lens element 66 in the form of beam B4 that enters the input side of the photodiode 48 through the optical filter 78. This filter passes only the light with the wavelength of 1310 nm. As a result, the optical signals B1, B2 and B3, B4 can be transmitted and received in a bidirectional mode without interference.

In spite of an increased number of optical elements (an additional mirror 62, an optical element 66, etc.) the module of the invention simplifies an adjustment procedure during assembling due to a novel module architecture with parallel arrangement of the diodes 42, 48 and due to the fact that all the beams B1, B2, B3, and B4 remain diffractionally limited and collimated on the major parts of their optical paths. In contrast to the existing optical modules of the aforementioned type in which any adjustment requires involvement of all optical elements simultaneously (because of converging and diverging shapes of the beams), in the module of the invention each element (42, 48, and 70) can be adjusted individually because on the main transmitting-receiving optical path Z—Z the beams remain collimated irrespective of relative movements between the elements (such as, e.g., mirrors).

Figure 3:
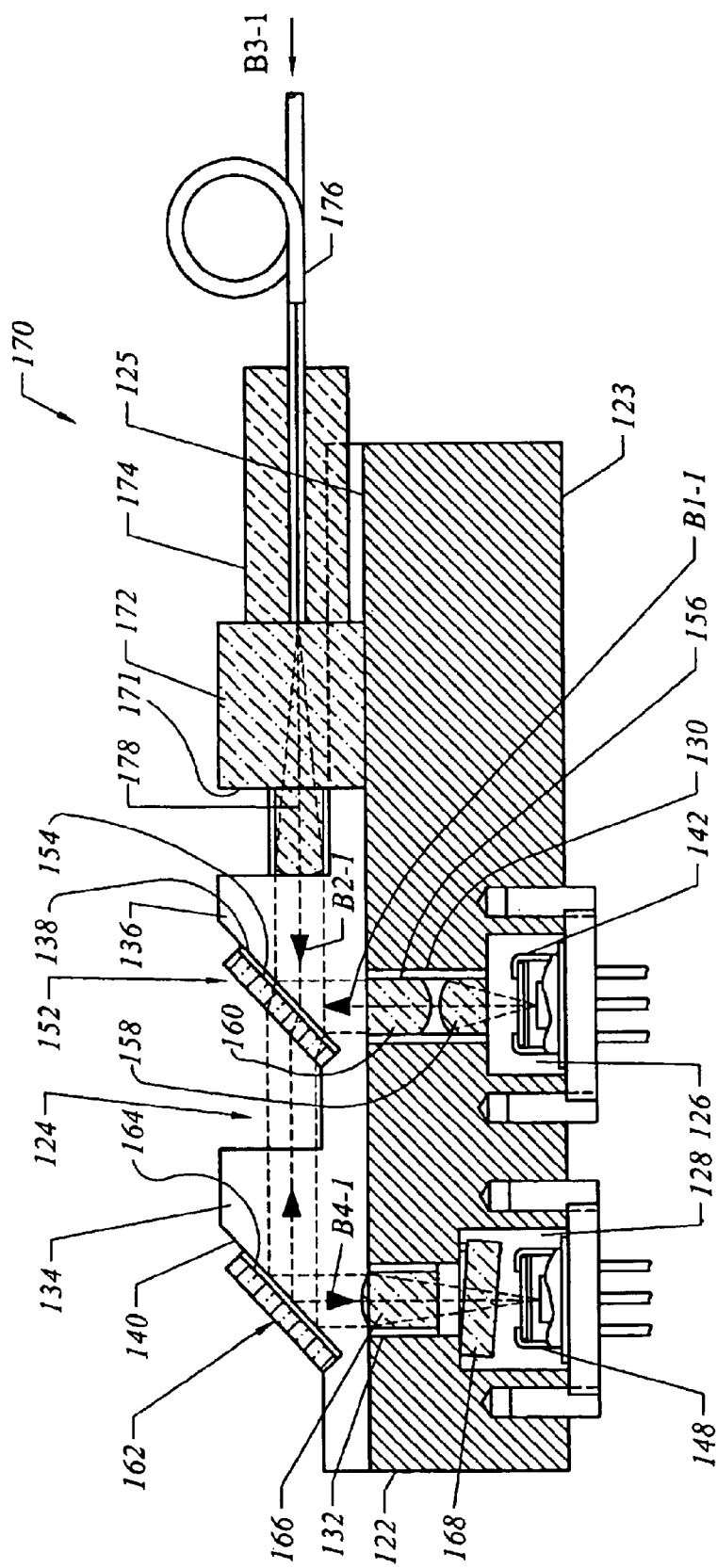
FIG. 3 is a view similar to FIG. 2 illustrating a module of a second embodiment in which positions of the laser diode and of the photodiode are reversed.

FIG. 3 illustrates a high-speed transmission bidirectional transceiver 120 made in accordance with another embodiment of the present invention. The transceiver of this embodiment in general is similar to the one described with reference to FIGS. 1 and 2 and differs from it in that the laser diode is located in a recess nearest to the optical fiber connection unit, while the photodiode is located in a recess corresponding to the position of the laser diode 42 of the previous embodiment. In the description of the embodiment of FIG. 3, optical elements and units similar to those of the previous embodiment will be designated by the same reference numerals with an addition of 100. For example, a laser diode 42 will be designated as 142, etc.

As can be seen from FIG. 3, the optical module 120 has a housing 122 in the form of a substantially rectangular parallelepiped with appropriate slots and recesses for accommodation of optical elements. In the embodiment shown in FIG. 3, the housing 122 has a through longitudinal slot 124 of a rectangular cross section cut on one side of the housing 122. On the side 123 opposite to the slot 124, the housing 122 has two parallel slots 126 and 128 of a rectangular cross section which are perpendicular to the direction of the longitudinal slot 124 and which extend in the transverse direction of the housing 122. The transverse slots 126 and 128 are connected with the longitudinal slot 124 by holes 130 and 132, respectively.

Two lugs 134 and 136, which are formed on the housing 122 on the side of the longitudinal slot 124, are beveled at 45° to the direction of the longitudinal slot 124 and to respective holes 130 and 132, which are aligned with the positions of the beveled surfaces 138 and 140. More specifically, the longitudinal axes of holes 130 and 132 coincide approximately with the middles of the planes of the respective beveled surfaces 138 and 140.

The bottom 125 of the slot 124, the side 123 of the housing 122 opposite to slot 124, as well as the surface of the slots 126, 128 and holes 130 and 132 are used as base or reference surfaces for assembling and positioning of the optical elements of the transceiver. Therefore these surfaces, slots, and opening should be produced with strict tolerances with regard to respective flatness, perpendicularity, and parallelism.

The slot 126 accommodates a laser diode 142. The laser diode is fixed to the housing 122 by means of locking pins inserted into respective openings of the housing 122 (the pins and respective openings, as well as some other parts identical to those of FIGS. 1 and 2 are not designated in FIG. 3 in order to simplify the drawing). The laser diode has output terminals extending outside the housing 122.

The slot 128, which is parallel to the slot 126, accommodates a photodiode 148.

The photodiode 148 is fixed to the housing 122 by means of locking pins similar to those of the first embodiment. Terminals of the photodiode 148 extend outward from the surface 123 of the housing 122.

The beveled surface 138 is used as a support for a dichroic mirror 152. The reflecting surface 154 of this mirror spans the longitudinal slot 124 in the direction transverse to the slot and faces the hole 130 at an angle of 45° to the direction of the hole axis. Inserted into the hole 130 is a two-lens objective 156 that consists of a first aspheric lens 158 and a second aspheric lens 160. As can be seen from FIG. 3, the two-lens objective 156 is located between the output side of the laser diode 142 and the reflection surface 154 of the dichroic mirror 152.

It is understood that a light beam B1-1 emitted by the laser diode 142 towards the mirror 152 will be fully reflected by the reflection surface 154 of this mirror in the direction parallel to the longitudinal slot 124 shown by the arrow B2-1 in FIG. 3.

The beveled surfaces 140 is used as a support for a second full-reflection mirror 162, which spans the longitudinal slot 124 in the direction transverse to the slot and faces the hole 132 at an angle of 45° to the direction of the hole axis. It should be noted that the mirror 162 is a full-reflection mirror, and its reflection coating 164 reflects light of any wavelength, which reaches this mirror from the side of the optical fiber after passing through the dichroic mirror 152. For this purpose, the dichroic mirror 152 should be transparent for light sent from the remote transceiver (not shown) to the photodetector 142.

Inserted into the hole 132 is a lens element 166, and an optical filter 168 is located between the lens element 166 and the photodiode 148. The optical filter 168 passes a specific wavelength, which is different from the wavelength of the light generated by the laser diode 142. For example, the laser diode 142 may generate a light signal with the wavelength of 1550 nm, while the filter 168 may pass only those optical signals that have a wavelength of 1310 nm.

On the side of the housing 122 opposite to the mirrors 152 and 162, the transceiver 120 is provided with an optical fiber connection unit 170 that consists of the following elements: an optically transparent spacer 172, which is vertically positioned by resting on the bottom surface 125 (FIG. 3) of the longitudinal slot; a fiber supporting ferrule 174 which is glued in a butt connection to the rear surface 173 of the spacer 172 and supports an optical fiber 176 having the end face in butt connection with the rear surface 172 of the spacer 172; and a lens element 178 glued to the front surface 171 of the spacer 172 and located in the slot 124.

The optical fiber connection unit 170 is preassembled so that the optical axis of the lens element 178 coincides, after installation of the unit 170 into the slot 124, with the optical axis Z—Z of the core of the optical fiber 176. The end of the optical fiber 76 opposite to the transceiver 120 may terminate in a standard single-mode fiber connector (female or male, not shown).

It is assumed that the aforementioned opposite end of the optical fiber 176 is connected to another transceiver (not shown) intended for communication with the transceiver 120 in a bidirectional mode by sending optical signals, e.g., of 1310 nm wavelength, to the photodiode 148 and by receiving optical signals, e.g., of 1550 nm wavelength from the laser diode 142.

The entire assembly shown in FIG. 3 is enclosed in a casing (not shown), which may be sealed and forms the transceiver 120 into a self-contained closed module.

The transceiver 120 operates in the following manner.

When laser diode 142 is activated, it begins to emit a first transmitting laser beam B1-1 (FIG. 3) that passes through a lens objective 156 that collimates the beam B1-1 and directs it onto the full-reflection mirror 152. The full-reflection mirror 52 reflects the first transmitting beam B1-1 at an angle of 90° and transmits it in the form of the beam B2-1 towards the optical fiber connection unit 170. The use of aspheric lenses 158 and 160 in the lens objective 156 makes it possible to form the beams B1-1, B2-1 into diffractioanally limited and therefore substantially collimated beams within the length of the transceiver 120 (hereafter beams B1-1 and B2-1 will be referred to as collimated beams). Such shape of the beam B2-1, which has an essentially permanent cross-section on a section of the optical path from the mirror 152 to the end face of the optical fiber 176, is an important distinguishing feature of the transceiver 120 of the invention. Formation of the aforementioned collimated beams significantly simplifies alignment of optical elements. For example, after a sub-unit consisting of the mirror 152 and the objective lens 156 and a sub-unit consisting of the mirror 162, the lens element 178, and the filter 168 are preassembled, further fine alignment of the laser diode 142, the photodiode 148, and the optical fiber connection unit 170 can be carried out individually and independently of each other.

The beam B2-1, reflected from the reflection surface 154 of the mirror 152 passes through the lens element 178 that centers the beam B2-1 with the fiber core of the optical fiber 176, so that information contained in the first transmitting beam (B1-1, B2-1) is conveyed to the receiver on the opposite end of the fiber.

Simultaneously, another optical signal in the form of the beam B3-1 (FIG. 3) is transmitted through the same optical fiber 176 in the direction opposite to the direction of the beam B2-1. The beam B3-1 should be an optical beam with the wavelength different from 1550 nm, e.g., it may have a wavelength of 1310 nm. The lens element 178 collimates the beam B3-1 into a collimated beam, which is directed towards the mirror 162. The reflection surface 164 of this mirror reflects the beam B3-1 at an angle of 90° towards the lens element 66 in the form of beam B4-1 that enters the input side of the photodiode 148 through the optical filter 178. This filter passes only the light with the wavelength of 1310 nm. As a result, the optical signals B1-1, B2-1 and B3-1, B4-1 can be transmitted and received in a bidirectional mode without interference.

In addition to advantages inherent in the first embodiment, i.e., simplified alignment during assembling and increase in the range of transmission speeds due to parallel arrangement of the diodes, the transceiver 120 of the embodiment of FIG. 3 has an advantage over the first embodiment. More specifically, in the embodiment of FIG. 3, a phenomenon of cross talks (generation of parasitic signals resulting from penetration of secondary light signals to the photodiode, e.g., parasitic signals generated by the closely located laser diode) is significantly reduced. This is achieved due to the fact that, in contrast to the device of FIGS. 1 and 2, in which the light signal of the laser diode 42 passes through the reflection mirror 62 with possibility of partial reflection of the beam B2 to the photodiode 48, the light signal B2-1 of the laser diode 142 enters directly the collimator lens 148 and then the optical fiber 175 beyond the limits of the area where the photodiode 148 is located.

Figure 4:
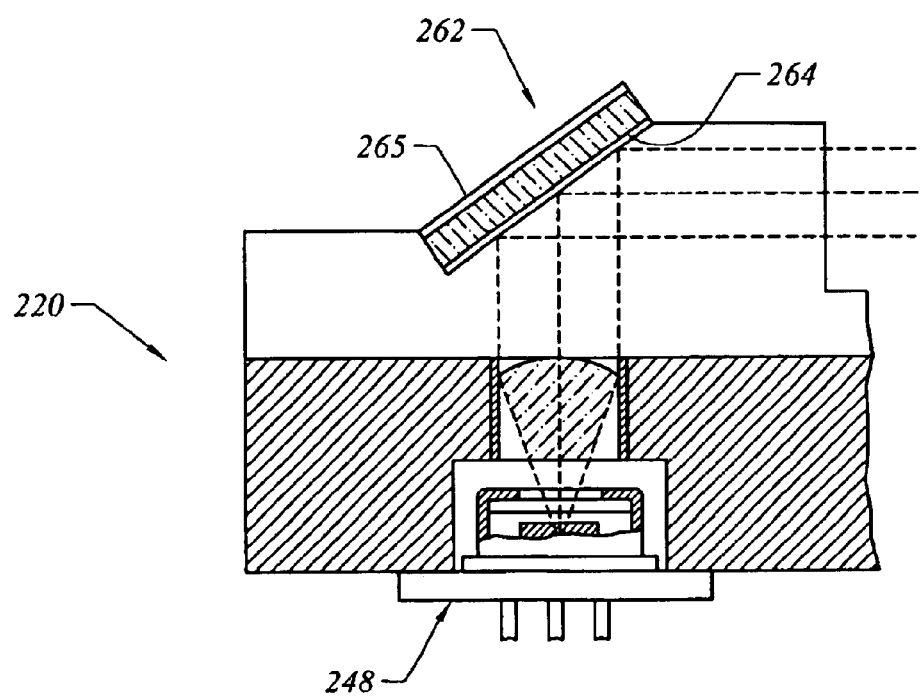
FIG. 4 is a fragmental view of the device of FIG. 3 with the second mirror coated with a selective reflection coating for reflecting only the light of a specific wavelength.

A fourth embodiment of the transceiver 220 of the invention is shown in FIG. 4 which is a fragmental view of the module illustrating only the part thereof that contains a photodiode 248 with surrounding optical elements. In general, the architecture of the transceiver 220 of the fourth embodiment corresponds to the second embodiment shown in FIG. 3 with position of the photodiode on the side of the housing 222 remote from the optical fiber connection unit (not shown in FIG. 4). In this embodiment, the mirror 262 associated with the photodiode 248 has a selective-reflection coating 264 that faces the photodiode 248 and reflects the light of a specific wavelength, e.g., of 1310 nm, that is received from the remote transceiver (not shown). On the side opposite to the selective-reflection coating 264, the mirror 262 has a blackening coating 265 intended for absorbing any light that may pass through the reflection coating 264. In other words, the selective-reflection coating 264 fulfils the function of the optical filter 168 shown in FIG. 3. Therefore, the construction of the third embodiment of FIG. 4 is simplified due to elimination of the optical filter 168.

Figure 5:
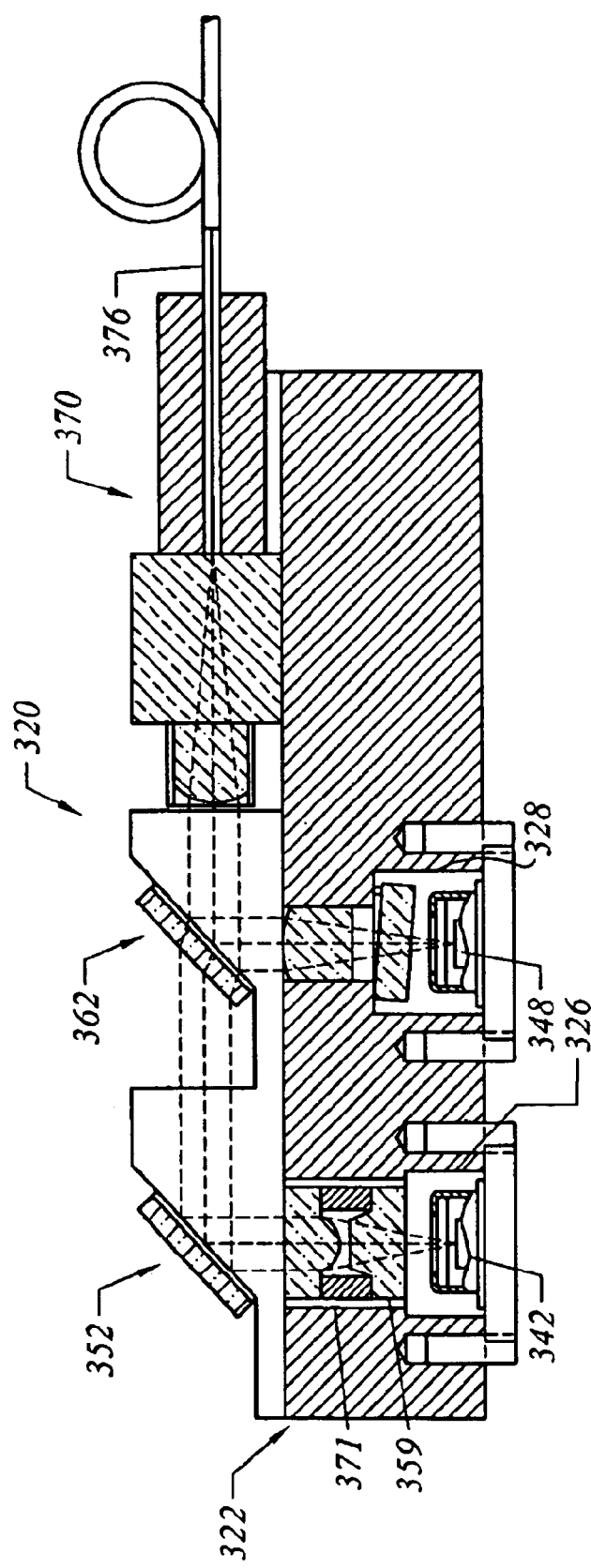
FIG. 5 is a view similar to FIG. 2 illustrating an embodiment where collimation of the beam generated by the laser diode is carried out by means of an anamorphic microobjective.

FIG. 5 illustrates a bidirectional optical transceiver 320 of the fifth embodiment of the invention, which, in general, is similar to the transceiver 20 of the first embodiment shown in FIGS. 1 and 2. With regard to the embodiment of FIG. 5, description of parts and units identical to those shown in FIGS. 1 and 2 will be omitted, and those parts, which are designated, will be indicated by the same reference numerals as in FIGS. 1 and 2, but with an the addition of 300.

Figure 6:
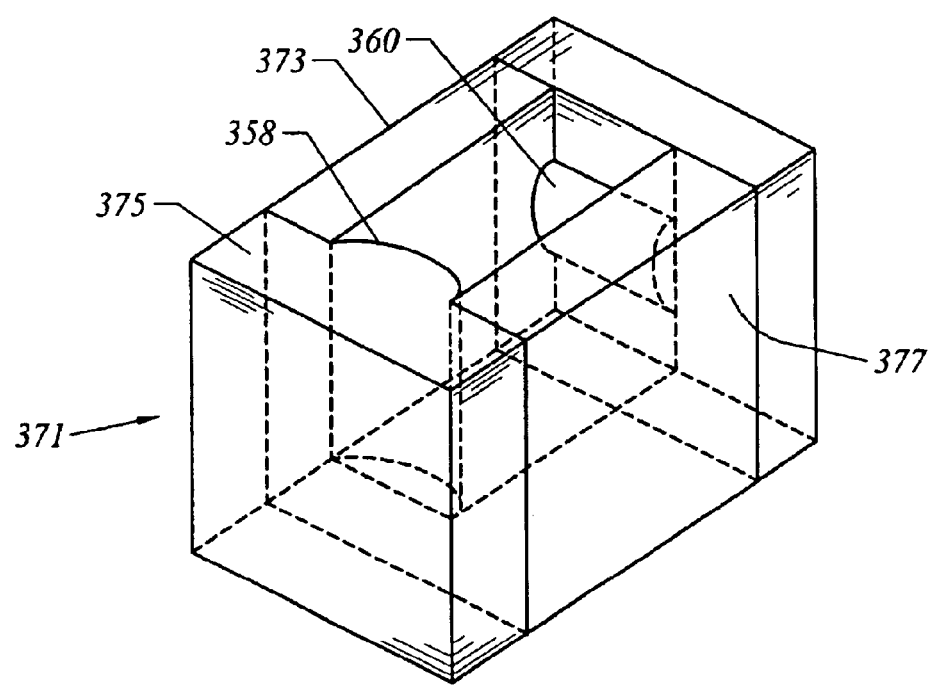
FIG. 6 is a three-dimensional view of a pre-assembled anamorphic micro-objective unit located in a housing.

The main distinction of the embodiment of FIG. 5 from the one shown in FIGS. 1 and 2 consists in that a two-lens objective 356 is formed by two cylindrical lenses having orthogonally arranged meridians. In other words, the objective 356 is a so-called anamorphic objective, in which the lenses provide difference in magnification along mutually perpendicular meridians. Such an objective is more effective for coupling a laser diode 342 with an optical fiber 376 of an optical fiber connection unit 370. As shown in FIG. 6, which is a three-dimensional view of the anamorphic objective assembly 371, the assembly has a housing 373 in the form of a hollow rectangular parallelepiped with outer reference surfaces 375 and 377 used for positioning and accurately spacing the cylindrical microlenses 360 and 358. More specifically, the housing 373 is sandwiched between the lenses 360 and 358. In order to install the assembly 371 composed of the housing 371 with the lenses 360 and 358, the housing 322 has an additional transverse rectangular slot 359 for insertion of the assembly 371. The rest of the system is the same as in the first embodiment. The devices of the third, fourth, and fifth embodiments operate in the same manner as the devices of the first and second embodiment. Therefore description of the operation of the bidirectional transceivers shown in FIGS. 4 and 5 is omitted.

Thus it has been shown that the optical module of the invention for a high-speed bidirectional transceiver is simple in construction, inexpensive to manufacture, facilitates optical alignment of the optical components during assembling and therefore is suitable for mass production, utilizes short lead wires that results in low inductivity of the device, can be mounted on a PC board and matched with its circuitry, and allows, in combination with respective electronics, to reach data transmission speeds exceeding 1 Ggbit/sec.

Figure 7A:
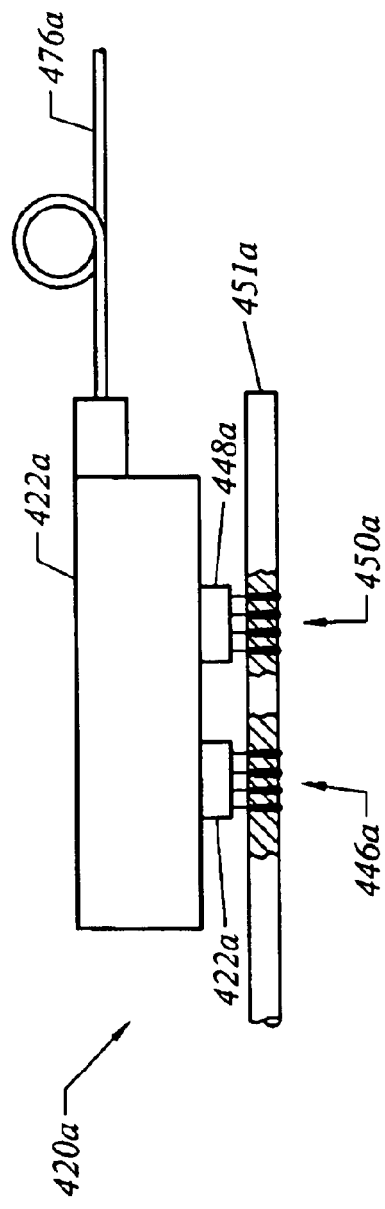
FIG. 7A is a view illustrating an architecture of the existing transceiver module.
Figure 7B:
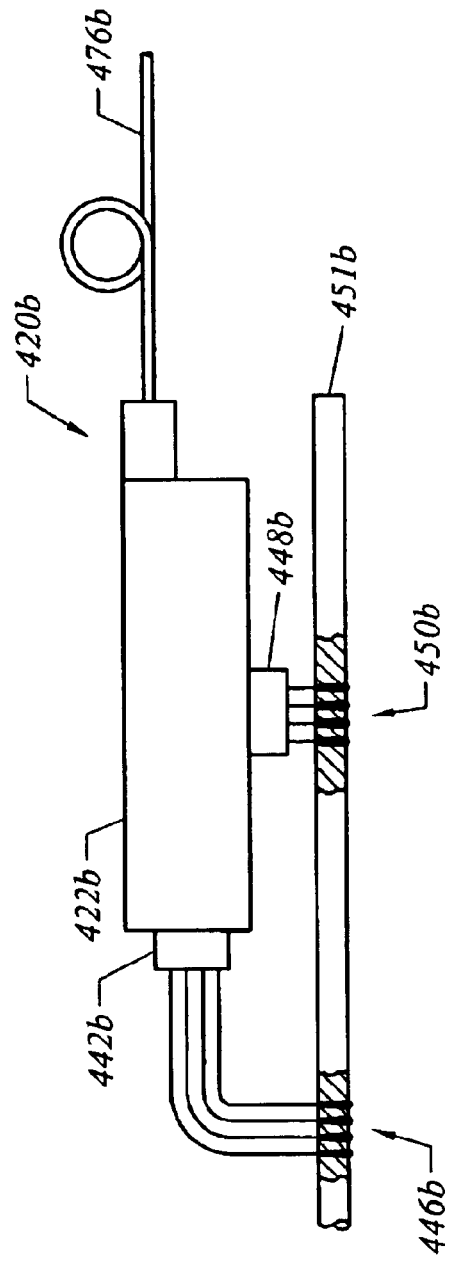
FIG. 7B is a view illustrating an architecture of the transceiver module of the invention.

Furthermore, it has been shown that in contrast to known transceiver modules 420b having the architecture of the type shown in FIG. 7B, the optical transceiver module 420a of the invention, that has the architecture shown in FIG. 7A, the laser diode 442a and the photodiode 448a of the transceiver 420a are arranged side by side in closely located recesses of the module housing 422a. The architecture of the module 420a makes it possible to shorten distances for guiding lead wires 446a and 450a from the terminals of the PC board 451a to the respective terminals of the transmitting and receiving diodes 442a and 448a (FIG. 7A), as compared to respective lead wires 446b and 450b shown in FIG. 7B.

Although the invention has been described with reference to specific embodiments and drawings, it is understood that these embodiments are shown only as examples and that many changes and modifications are possible within the scope of the attached patent claims provided that the optical beams remain collimated along major parts of the optical paths through the module. For example, instead of the so-called pig-tailed module shown and described in the drawing and specification, the module of the invention may be produced in the from of a "plug-in" module with standard receptacle connector for connection to an optical fiber line. The objectives may contain a number of lenses different from two, e.g., one, or three lenses. The optical elements that collimate the beams directed towards the photodiode and the optical fiber may be cylindrical instead of circular aspherical. The housing of the module can be monolithic or assembled from composite parts. The laser diode and the photodiode can be attached by means different from those shown in the drawings. The mirrors may have different coatings and may be of different types, including narrow waveband interference-type mirrors.

What is claimed is:

1. An optical module for a high-speed bidirectional transceiver having a first optical path and a second optical path for transmitting optical beams in mutually opposite directions comprising:

a housing having a longitudinal member with a top surface and a bottom surface;

a first cavity disposed in said longitudinal member shaped for mounting a first optical device;

a second cavity disposed in said longitudinal member and spaced apart from said first cavity shaped for mounting a second optical device;

an optical signal generating unit disposed in said first cavity, said optical signal generating unit including a laser diode and a first collimating lens unit for generating a collimated outgoing beam having a first wavelength from a first opening in said top surface;

an optical signal receiving unit disposed in said second cavity, said optical signal receiving unit including an optical detector receiving light from a second opening in said top surface;

an optical fiber connection unit disposed at one end of said longitudinal member and spaced apart from said first cavity and said second cavity, said optical fiber connection unit having a second collimating lens unit collimating light received from an optical fiber at a second wavelength into an incoming beam and receiving said collimated outgoing beam;

a first mirror reflective at said first wavelength disposed above said top surface of said member proximate said first opening for redirecting said collimated outgoing beam to a direction parallel to said top surface directed towards said second collimating lens unit; and a second mirror reflective at said second wavelength disposed above said top surface proximate said second opening for redirecting said collimated incoming beam to said optical signal receiving unit;

wherein said collimated outgoing beam has a substantially constant cross-section from said first mirror to said optical fiber connection unit to facilitate independent fine alignment of said laser diode and said optical detector; and wherein said housing is adapted for said laser diode and said optical detector to be electrically coupled to a printed circuit board with an inductance sufficiently low to permit data rates of at least about one Gigabit/second.

2. The optical module of claim 1, wherein said first collimating lens unit is a collimating optical objective comprised of at least one circular aspherical lens.

3. The optical module of claim 1, wherein said first collimating lens unit is a collimating anamorphic objective comprised of at least two mutually perpendicular cylindrical lenses.

4. The optical module of claim 1, wherein said first collimating lens unit is a collimating optical objective comprised of at one circular aspherical lens.

5. The optical module of claim 1, wherein said first collimating lens unit is a collimating anamorphic objective comprised of at least two mutually perpendicular cylindrical lenses.

6. The optical module of claim 1, wherein said optical fiber connection unit is a pre-assembled unit comprising said second collimating lens unit, an optical fiber holder, a spacer between said second collimating lens unit and said optical fiber holder, and an optical fiber, said spacer being sandwiched between said second collimating lens unit and said optical fiber holder, said fiber having a core but coupled to said spacer.

7. An optical module for a high-speed bidirectional transceiver, comprising:

a housing having a longitudinal member with a top surface and a bottom surface;

a first cavity disposed in said longitudinal member shaped for mounting a first optical device;

a second cavity disposed in said longitudinal member and spaced apart from said first cavity shaped for mounting a second optical device;

an optical signal generating unit disposed in said first cavity, said optical signal generating unit including a laser diode and a first collimating lens unit for generating a collimated outgoing beam having a first wavelength from a first opening in said top surface;

an optical signal receiving unit disposed in said second cavity, said optical signal receiving unit including an optical detector for receiving light from a second opening in said top surface;

an optical fiber connection unit attached to one end of said longitudinal member and spaced apart from said first cavity and said second cavity, said optical fiber connection unit having a second collimating lens unit held in optical alignment with an optical fiber to couple incoming and outgoing light between said optical fiber and said optical module, said second collimating lens unit collimating incoming light received from said optical fiber at a second wavelength to generate a collimated incoming beam;

a first mirror reflective at said first wavelength disposed above said top surface proximate said first opening for redirecting said collimated outgoing beam to a direction parallel to said top surface directed towards said second collimating lens unit; and a second mirror reflective at said second wavelength disposed above said top surface for redirecting said collimated incoming beam to said optical signal receiving unit;

wherein said collimated outgoing beam has a substantially constant cross-section from said first mirror to said optical fiber connection unit and said collimated incoming beam has a substantially constant cross-section from said second optical collimating unit to said second mirror; and wherein said first collimating lens unit and said second collimating lens unit are selected such that said collimated incoming beam and said collimated outgoing beam facilitate independent fine optical alignment of said laser diode, said optical detector, and said optical fiber connection unit.

8. The optical module of claim 7, wherein said housing is adapted for said laser diode and said optical detector to be electrically coupled to a printed circuit board with an inductance sufficiently low to permit data rates of at least about 1 Gigabits/second.

9. The optical module of claim 7, wherein said optical fiber connection unit includes an optically transparent spacer sandwiched between said second collimating lens unit and an optical fiber holder, wherein an optical fiber butt coupled to said transparent spacer.

10. The optical module of claim 7, wherein said optical fiber connection unit includes a ferrule for holding an optical fiber and an optically transparent spacer sandwiched between said second collimating lens unit and said ferrule.

11. An optical module for a high-speed bidirectional transceiver, comprising:

a housing having a longitudinal member with a top surface and a bottom surface;

a first cavity disposed in said longitudinal member shaped for mounting a first optical device;

a second cavity disposed in said longitudinal member and spaced apart from said first cavity shaped for mounting a second optical device;

an optical signal generating unit disposed in said first cavity, said optical signal generating unit including a laser diode and a first collimating lens unit for generating a collimated outgoing beam having a first wavelength from a first opening in said top surface;

an optical signal receiving unit disposed in said second cavity, said optical signal receiving unit including an optical detector for receiving light from a second opening in said top surface;

a pre-assembled optical fiber connection unit attached to one end of said longitudinal member, said pre-assembled optical fiber connection unit having a second collimating lens unit held in optical alignment with an optical fiber to couple incoming and outgoing light between said optical fiber and said optical module, said second collimating lens unit collimating incoming light received from said optical fiber at a second wavelength to generate a collimated incoming beam;

a first mirror reflective at said first wavelength disposed above said top surface proximate said first opening for redirecting said collimated outgoing beam to a direction parallel to said top surface directed towards said second collimating lens unit; and a second mirror reflective at said second wavelength disposed above said top surface proximate said second opening for redirecting said collimated incoming beam to said optical signal receiving unit;

wherein said outgoing beam has a substantially constant cross-section from said first mirror to said optical fiber connection unit and said incoming beam has a substantially constant cross-section from said second optical collimating unit to said second mirror; and wherein said first collimating lens unit and said second collimating lens unit are selected such that said collimated incoming beam and said collimated outgoing beam facilitate independent fine optical alignment of said laser diode, said optical detector, and said pre-assembled optical fiber connection unit.

12. The optical module of claim 11, wherein said housing is adapted for said laser diode and said optical detector to be electrically coupled to a printed circuit board with an inductance sufficiently low to permit data rates of at least about one Gigabit/second.

* * * * *